United States Patent [19]
Liu

[11] Patent Number: 5,588,178
[45] Date of Patent: Dec. 31, 1996

[54] IMPELLER FOR BLOWER/VACUUM

[75] Inventor: Li-Hsiung Liu, Tucson, Ariz.

[73] Assignee: McCulloch Corporation, Tucson, Ariz.

[21] Appl. No.: 478,449

[22] Filed: Jun. 7, 1995

[51] Int. Cl.[6] .................................................. A47L 5/24
[52] U.S. Cl. ............................... 15/330; 15/339; 241/55; 241/56; 416/223 B
[58] Field of Search ............................ 15/328, 330, 339, 15/405; 241/55, 56, 58; 415/121.1; 416/223 B

[56] References Cited

U.S. PATENT DOCUMENTS

| | | |
|---|---|---|
| Re. 33,050 | 9/1989 | Tuggle et al. . |
| 1,843,088 | 1/1932 | Minnard . |
| 2,445,111 | 7/1948 | Gouinlock . |
| 3,255,793 | 6/1966 | Clute ........................ 415/121.1 |
| 3,850,543 | 11/1974 | Kaelin ....................... 415/121.1 |
| 4,049,204 | 9/1977 | McKee ........................... 241/55 |
| 4,253,800 | 3/1981 | Segawa et al. . |
| 4,325,163 | 4/1982 | Mattson et al. .................. 15/330 |
| 4,451,951 | 6/1984 | Satoh . |
| 4,594,052 | 6/1986 | Niskanen .................... 415/121.1 |
| 4,644,606 | 2/1987 | Luerken et al. . |
| 4,674,146 | 6/1987 | Tuggle et al. . |
| 4,694,528 | 9/1987 | Comer et al. . |
| 4,762,465 | 8/1988 | Friedrichs . |
| 4,870,714 | 10/1989 | Miner . |
| 4,904,159 | 2/1990 | Wickoren . |
| 4,930,984 | 6/1990 | Kesel et al. . |
| 4,955,107 | 9/1990 | Kawai ............................. 15/330 |
| 5,000,660 | 3/1991 | Van Houten et al. . |
| 5,018,672 | 5/1991 | Peck et al. ....................... 241/55 |
| 5,245,726 | 9/1993 | Rote et al. ...................... 15/339 |
| 5,511,281 | 4/1996 | Webster ......................... 15/330 |

Primary Examiner—David Scherbel
Assistant Examiner—Terrence R. Till
Attorney, Agent, or Firm—Marshall, O'Toole, Gerstein, Murray & Borun

[57] ABSTRACT

This disclosure relates to an impeller for use in a centrifugal fan that also includes a housing and a drive shaft. The impeller is mounted on the shaft for rotation therewith within the housing. The impeller further includes a disk-shaped back plate and an axis of rotation extending through the center of the circular back plate. A plurality of circumferentially spaced fins or blades extend generally radially of the axis of rotation, selected blades including mulching parts and the remainder of the blades being devoid of the mulching parts. The mulching parts are adjacent the radially inner portions of the selected blades and the mulching parts extend substantially axially of the impeller and into an air intake opening of the housing. The selected blades having the mulching parts are circumferentially spaced and are separated by at least one remaining blade which is devoid of a mulching part.

5 Claims, 5 Drawing Sheets

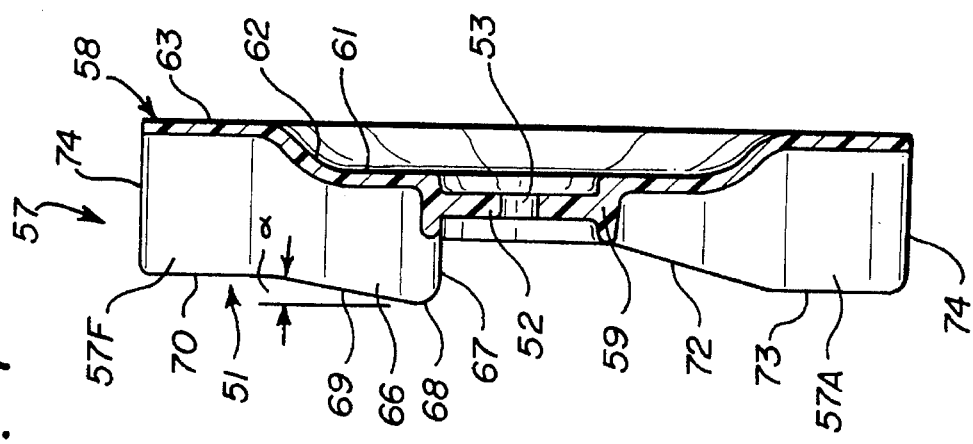
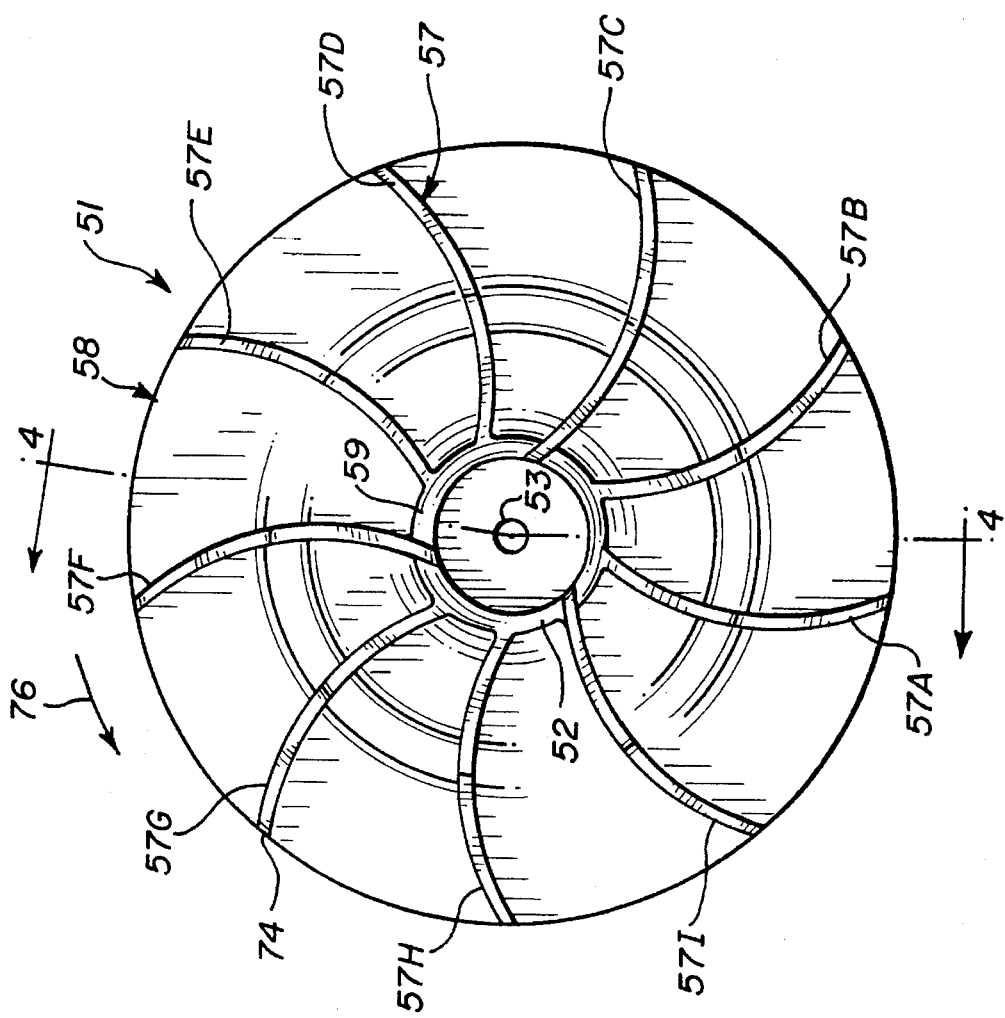

IMPELLER FOR BLOWER/VACUUM

FIELD AND BACKGROUND OF THE INVENTION

This invention relates to an air blowing machine, and more particularly to a portable blower/vacuum unit primarily for yard and garden use.

Portable blower/vacuum units are in common use in many residential areas. In one mode of use, the unit serves as a blower and delivers a high velocity stream of air for gathering leaves, twigs, etc. In another mode of use, the unit serves as a vacuum and is used to collect yard debris such as leaves, twigs, etc. For example, U.S. Pat. Nos. 4,644,606, No. 4,325,163 and No. 5,245,726 show units of this general nature.

Such units include a centrifugal impeller driven by a motor (gasoline or electric), the impeller being mounted in a scroll-shaped housing. The housing has a central air intake opening and a tangential air outlet opening, and the impeller propels the air stream through the housing and out the air outlet opening.

A problem encountered with such a unit when used in the vacuum mode is that debris tends to collect and jam in the air intake opening. The impeller extends close to the housing and the debris may become caught between them.

U.S. Pat. No. 4,325,163 discloses "a chopping or mulching blade 86" which is mounted on the impeller shaft upstream of the impeller, and U.S. Pat. No. 5,245,726 discloses a "cutting structure/cutting attachment 12" which, like the blade 86, is separate from the impeller and is mounted on the impeller shaft. In both of these patents, the blade or attachment is designed to mulch the incoming leaves, and the small particles of the mulch have less tendency to clog or jam the unit. However, a mulching blade in addition to an impeller increases the cost of the assembly.

In another centrifugal fan construction, the Minnard U.S. Pat. No. 1,843,088 shows fan vanes or blades having scoops formed on their radially inner sides, for increasing the capacity of the fan.

It is a general object of the present invention to provide a fan including an improved impeller, which avoids the foregoing problems.

SUMMARY OF THE INVENTION

Apparatus constructed in accordance with this invention comprises an impeller for use in a centrifugal fan that also includes a housing and a drive shaft. The impeller includes means for mounting the impeller on the shaft for rotation therewith within the housing. The impeller further includes a disk-shaped back plate and an axis of rotation extending through the center of the circular back plate. A plurality of circumferentially spaced fins or blades extend generally radially of the axis of rotation, selected blades including mulching parts and the remainder of the blades being devoid of the mulching parts. The mulching parts are adjacent the radially inner portions of the selected blades and the mulching parts extend substantially axially of the impeller and into an air intake opening of the housing. The selected blades having the mulching parts are circumferentially spaced and are separated by at least one remaining blade which is devoid of a mulching part.

BRIEF DESCRIPTION OF THE DRAWINGS

The invention will be better understood from the following detailed description taken in conjunction with the accompanying figures of the drawings, wherein:

FIG. 3 is a front view of an impeller constructed in accordance with this invention;

FIG. 4 is a sectional view taken on the line 4—4 of FIG. 3;

DETAILED DESCRIPTION OF THE INVENTION

Figure 1:
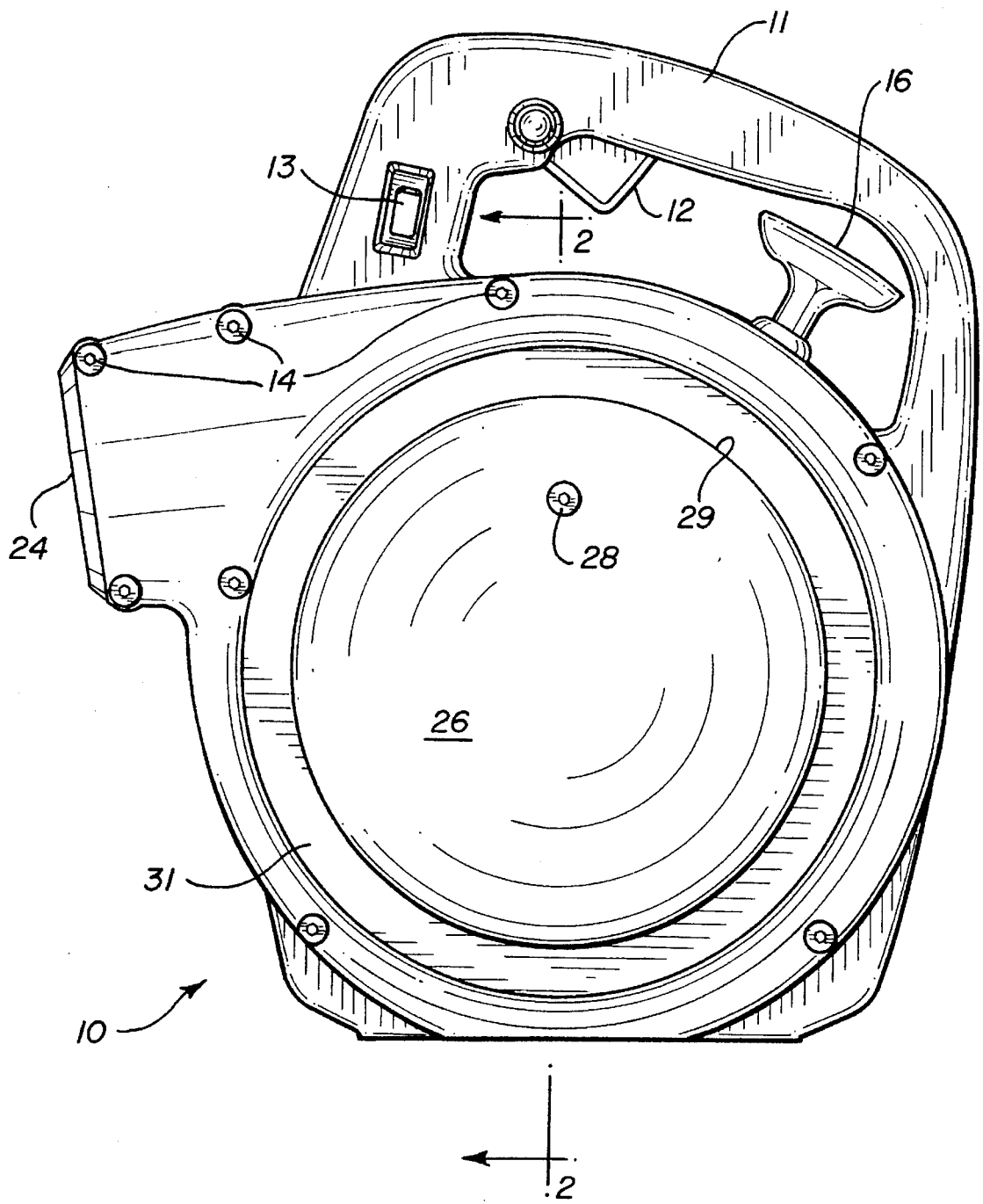
FIG. 1 is a front view of apparatus incorporating the present invention.

The drawings illustrate a specific example of apparatus incorporating the invention, and in this example the apparatus comprises a portable blower/vacuum unit. It includes an outer housing 10 which is usually made of molded plastic and has a carrying handle 11 formed on the top side. Control switches 12 and 13 are provided on the handle 11, and a plurality of screws 14 hold the parts of the housing together. While the unit may be powered by an electric motor or by a gasoline engine, an engine is illustrated and includes a pull handle 16 for a starter rope (not shown).

Figure 2:
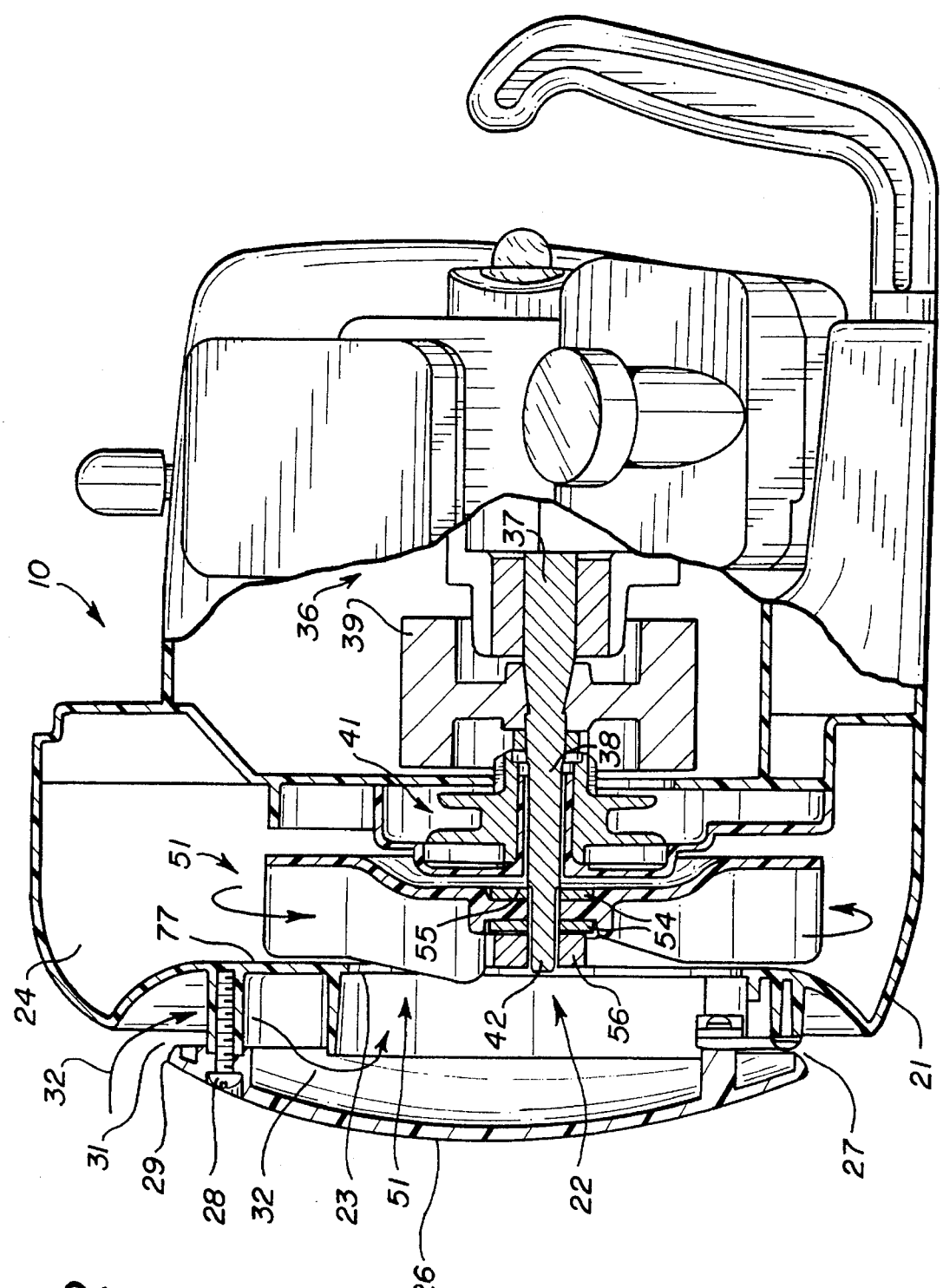
FIG. 2 is a sectional view taken on the line 2—2 of FIG. 1, showing the apparatus in its blower mode.

With reference to FIGS. 1 and 2, the housing 10 also forms a scroll-shaped air flow channel 21 for the air stream of a centrifugal fan 22. The channel 21 includes a circular centrally located intake opening 23 and a tangential air outlet opening 24. During use in the blower mode, the intake opening 23 is shielded by a cover 26 which is pivotably attached to the housing 10 by a hinge 27. A removable fastener 28 holds the cover 26 closed in the blower mode. The outer periphery 29 of the cover 26 is spaced from the housing 10, thereby forming an annular air flow passage 31 between the outer periphery of the cover 26 and the housing. The arrows 32 illustrate the flow of the intake air in the blower mode.

As mentioned above, the unit includes a gasoline engine 36 mounted within the housing 10. The construction of the engine does not form part of this invention and therefore its details are not shown. It includes a crankshaft 37 coupled to an impeller drive shaft 38, and a flywheel 39 is mounted on the shafts 37 and 38. A starter mechanism 41 is also provided.

Figure 5:
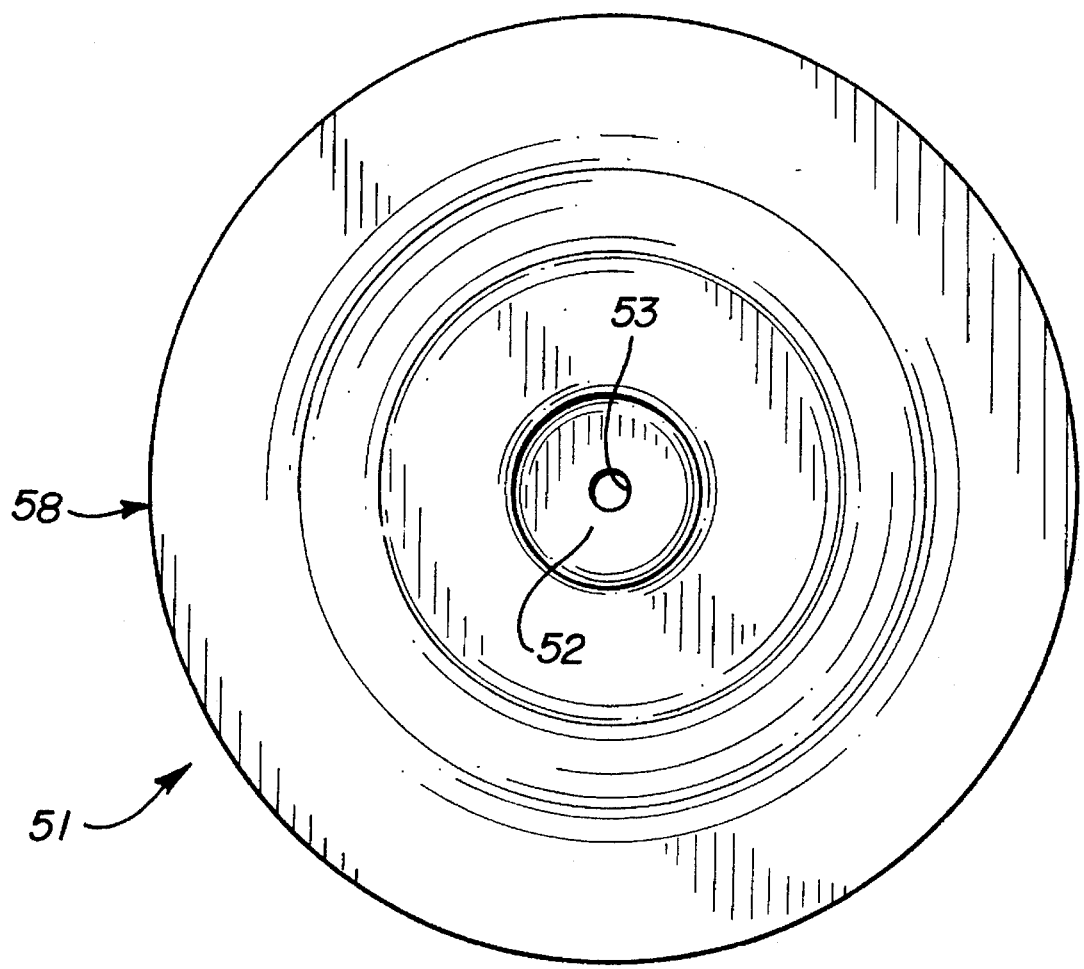
FIG. 5 is a back view of the impeller.

On the outer end 42 (the left end as seen in FIG. 2) of the drive shaft 38 is mounted a centrifugal impeller 51 of the fan 22. With further reference to FIGS. 3 to 5, the impeller 51 includes a circular central hub 52 having a centrally located mounting hole 53. The impeller is mounted with the drive shaft end 42 extending through the hole 53; washers 54 are mounted on opposite sides of the hub 52; and a nut 56 secures the hub and the washers against a shoulder 55 on the shaft.

The impeller 51 further includes a plurality of fins or blades 57 which extend substantially radially outwardly from the hub 52. On the back side (toward the right as seen in FIG. 4) of the impeller 57 is a circular disk-like back plate 58 which extends from the hub 52 to the outer periphery of the impeller, and the blades 57 extend forwardly (toward the left as seen in FIG. 4) from the back plate 58. The hub 52 includes an annular axially extending flange 59 which merges with the back plate 58. In the specific example of the invention illustrated and described herein, from the flange 59 the back plate 58 includes a radial portion 61, a rearwardly curved portion 62 and a radial portion 63.

The blades 57 include two sets or groups, the two sets having different profiles as illustrated by the two blades shown in FIG. 4. In the specific example illustrated in the drawings, a total of nine blades 57A to 57I are provided; selected blades 57C, 57F and 57I comprise one set, and the remaining blades 57A, 57B, 57D, 57E, 57G and 57H comprise the other set. In accordance with this invention, the blades 57C, 57F and 57I are identical and include mulching parts 66 best shown in FIG. 4, whereas the remaining blades are identical and do not include such mulching parts.

With reference to FIG. 4, each of the selected blades 57C, 57F and 57I extends axially forwardly from the radially inner side of the flange 59 as indicated at 67, then the forward edge curves axially and radially outwardly as indicated at 68, then angles radially outwardly and rearwardly as indicated at 69, and then extends radially outwardly as indicated at 70 to the outer periphery of the blade. The angle between the edge 69 and a radial line is substantially 9°.

With regard to the remaining blades 57A, 57B, 57D, 57E, 57G and 57H, the forward edge of each blade angles radially outwardly and forwardly from the forward end of the flange 59 at an angle of substantially 15° from a radial line as indicated at 72, and then extends radially outwardly as indicated at 73.

Thus, the mulching parts 66 are defined herein as the portions of the selected blades 57C, 57F and 57I which protrude forwardly from a circular plane passing through the edges 72 of the remaining blades.

All of the blades have an axially extending outer edge 74 as shown in FIG. 4. Further, as shown in FIG. 3, all of the blades curve radially and toward the direction of rotation (indicated by the arrow 76).

Figure 6:
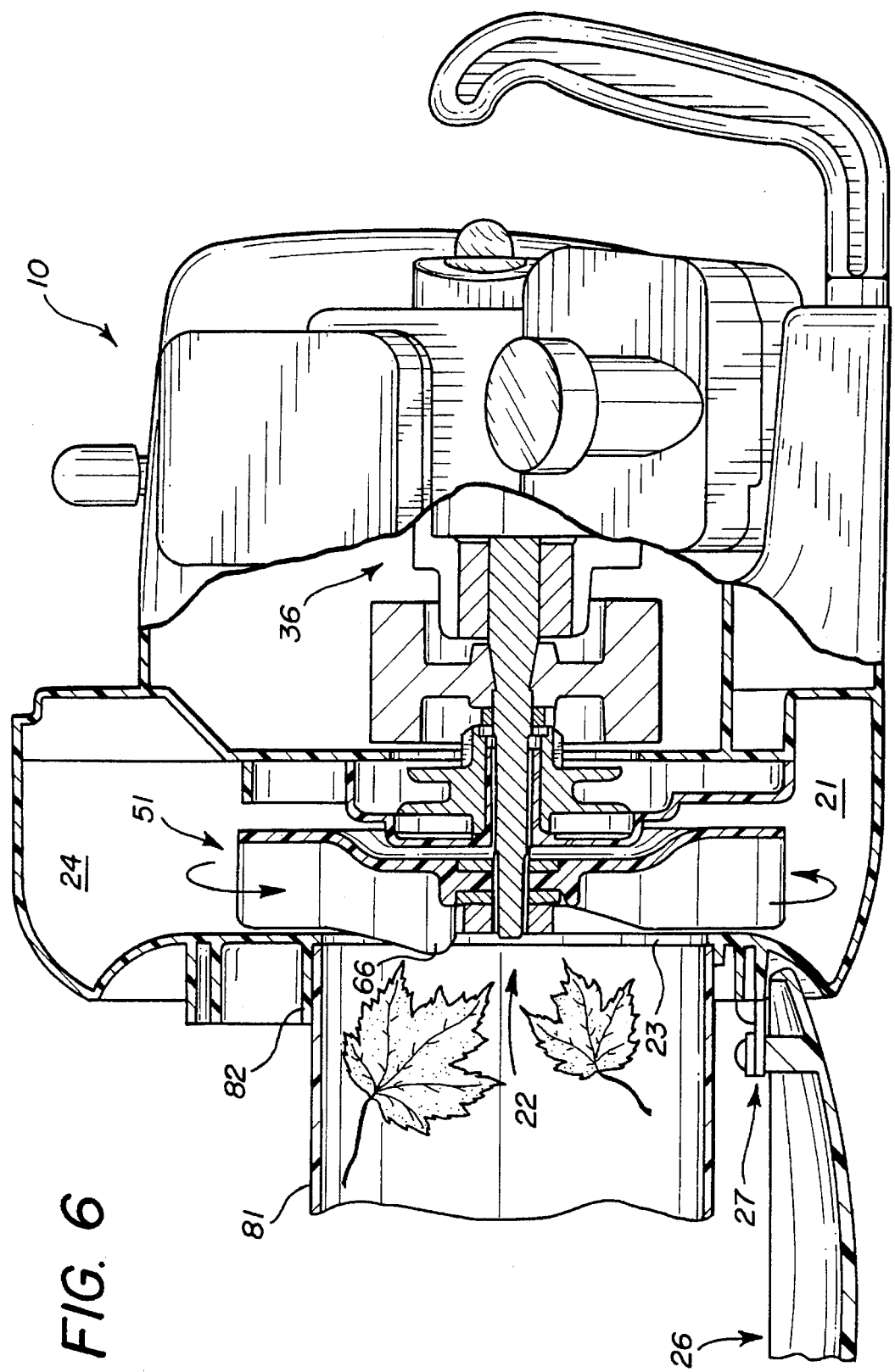
FIG. 6 is a view similar to FIG. 2 but showing the apparatus in its vacuum mode.

With reference to FIGS. 2 and 6, the blades 57 extend into the air channel 21 of the housing and propel a high velocity stream of air from the outlet opening 24. The forward and outer edges of the blades are spaced somewhat from the walls 77 forming the channel, and the angled edges 69 and 72 face the intake opening 23. The mulching parts 66 formed by the edges 67, 68 and 69 of the blades 57C, 57F and 57I extend partially into the intake opening, whereas the edges 72 are spaced rearwardly from the intake opening.

When the unit is being used in its vacuum mode (see FIG. 6), the cover 26 is moved to the open position by removing the fastener 28 and swinging the cover on the hinge 27. A vacuum tube 81 is then inserted into an annular flange or skirt 82 formed around the intake opening 23. The stream of air carries with it debris, such as leaves and small twigs, which may tend to get caught between the housing surface 77 and the fan blades and jam the intake opening. However, the mulching parts of the blades 57C, 57F and 57I tend to shred the debris and clear the intake opening. The remaining blades 57A, 57B, 57D, 57E, 57G and 57H draw the leaves into the intake opening and into the annular space swept by the mulching parts 66, where they are exposed to and chopped by the mulching parts 66. Thus, the blades serve both to propel the air stream through the channel 21 and to mulch the leaves sufficiently to keep the intake opening clear.

The impeller is preferably molded in a single piece of strong plastic of the type normally used for an impeller. While not illustrated, a safety switch may be provided adjacent the intake opening, to prevent the engine 36 from operating when the cover 26 is open and a vacuum tube 81 is not fastened in the intake opening.

What is claimed is:

1. Apparatus having a vacuum mode of operation, comprising a housing, a drive shaft mounted in said housing for rotation on an axis, an impeller fastened to said drive shaft and rotatable therewith, said housing forming an air flow channel around said impeller, said channel having a central air intake opening adjacent said axis and an air outlet opening adjacent the outer periphery of said impeller, said impeller comprising a hub fastened to said drive shaft, a plurality of blades extending generally radially outwardly from said hub, and a back plate extending generally radially outwardly from said hub, each of said blades having a back edge attached to said back plate, said plurality of blades including a first set of blades and a second set of blades, said second set of blades including a mulching part adjacent said hub, said mulching part of said second set of blades extending substantially parallel to said axis of rotation and extending forwardly of said first set of blades.

2. Apparatus as set forth in claim 1, wherein said blades have outer edges which move in a peripheral circle having said axis as a center, and said housing is radially spaced from said circle entirely around said impeller.

3. Apparatus as set forth in claim 1, wherein each of said blades further has a front edge extending adjacent but spaced from said housing.

4. An impeller for a blower/vacuum unit including a housing having an air inlet opening and an air outlet opening, said impeller comprising a mounting hub, a plurality of blades secured to and extending generally radially outwardly from said hub, said blades having a forward side which faces the air inlet opening, said blades comprising a plurality of circumferentially spaced selected blades and a plurality of circumferentially spaced remaining blades, said selected blades being separated by at least one remaining blade, and each of said selected blades including an integrally formed mulching part, said hub having an axis of rotation and each of said mulching parts extending parallel to said axis, and said mulching parts extending beyond said forward sides of said remaining blades.

5. Apparatus as set forth in claim 4, wherein said impeller further includes a circular back plate which extends substantially radially of said hub and is secured to said blades.

* * * * *